March 16, 1965 M. A. NADLER 3,173,621
METHOD OF ENCASING DEFORMABLE SUBSTANCE
WITH FILAMENT WINDINGS
Filed Nov. 7, 1962
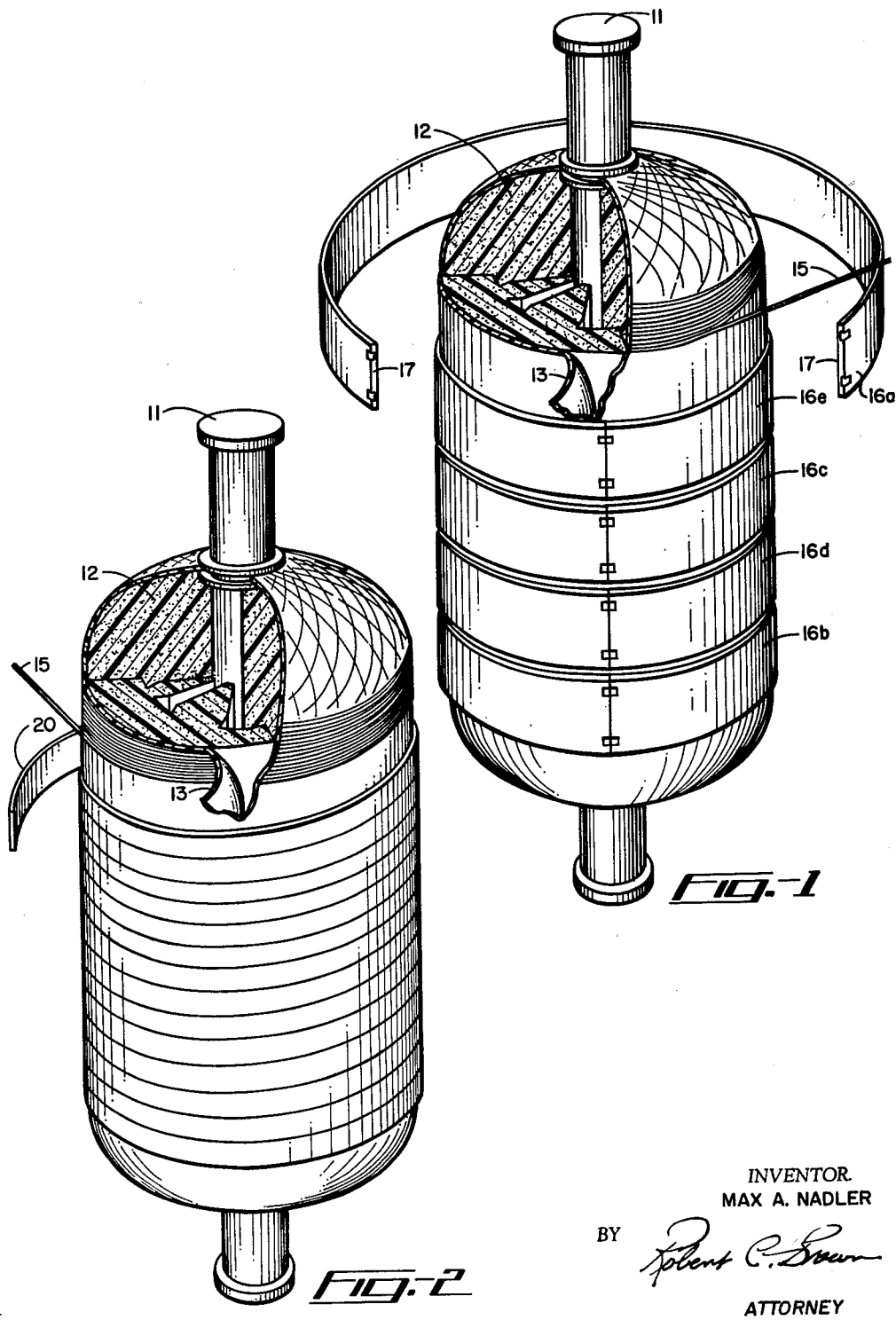
INVENTOR.
MAX A. NADLER
BY
ATTORNEY

United States Patent Office 3,173,621
Patented Mar. 16, 1965

3,173,621
METHOD OF ENCASING DEFORMABLE SUBSTANCE WITH FILAMENT WINDINGS
Max A. Nadler, Glendora, Calif., assignor to Aerojet-General Corporation, Azusa, Calif., a corporation of Ohio
Filed Nov. 7, 1962, Ser. No. 236,072
6 Claims. (Cl. 242—7)

This invention relates to an improvement in the winding of a filament about a deformable substance and more particularly to a novel method involving the temporary encasement of a non-rigid substance subject to deformation when a filament is being wound thereabout such that the winding of the filament on the substance can be accomplished without significant deformation of the substance.

In the field of coating or winding filaments over a non-rigid substance where the filament is applied with some tension, it has been observed that the tension in the filament can cause a creeping or bulging of the substance in advance of the filament windings and therefore bring about a sometimes substantial deformation of the substance. Such deformation of the substance is often not only undesired, but may also be a distinct disadvantage.

One method of retaining the shape of a non-rigid substance during the winding of a filament thereover has involved the freezing of the substance, but there are serious disadvantages to this procedure since there is a possibility of causing damage to the substance by the freezing thereof. In addition, the filament being wound about the frozen substance may be deleteriously affected by the low temperature of the frozen substance.

The present invention overcome the deformation problem encountered in winding a filament over non-rigid matter—such as a low-modulus, elastomeric substance, especially a propellant grain—by providing for suitable confinement and restraint of the substance during the winding of the filament thereabout. When the surfaces of the substance over which the filament is to be wound are not properly restrained, the substance is likely to move and shift under the tension applied to the filament being wound thereabout resulting in undesirably high portions of buckled reinforcements and thus in a reduced load carrying ability for the structure.

Accordingly, it is an object of the present invention to provide a method for winding filaments over a non-rigid substance wherein the substance is not significantly deformed due to the tension of the filament winding.

It is another object of the present invention to provide a method for winding filaments over a non-rigid substance which is simple in operation and adaptable to a variety of such substances.

It is a further object of the present invention to provide a method for winding filaments over a non-rigid substance wherein the filament is not affected by temperature conditions of the substance.

It is still a further object of this invention to provide a method for winding a filament over a non-rigid substance wherein the substance, though essentially deformable appreciably under low loads, is substantially confined temporarily during the winding of the filament thereabout in such a manner that the substance is not significantly deformed by the winding of the filament thereabout although there is a selected amount of tension in the filament.

The present invention provides a method for forming a case or enclosure comprising filament windings on a cured and properly shaped solid propellant grain, whereby the tendency of the elastomeric solid propellant grain to deform locally under the applied winding tension of the filament is avoided. Deformation of the solid propellant grain is held within allowable limits in accordance with the present invention.

Other objects and many of the attendant advantages of this invention will be readily appreciated as the same becomes better understood by reference to the following detailed description when considered in connection with the accompanying drawings, wherein:

FIGURE 1 is an isometric view, partially shown in section, illustrating one embodiment of the invention.

FIGURE 2 is an isometric view, partially shown in section, illustrating a second embodiment of the invention.

Referring now to the embodiment illustrated in FIGURE 1, there is shown a shaft 11 passing through and attached to the non-rigid substance 12, in the preferred embodiment a propellant grain, with an insulation liner 13 enclosing the substance 12. Substance 12 has been formed to a desired shape by processes not involved in the present invention; however, the substance 12 is not of such hardness as to resist deforming when a layer or casing is formed about the substance 12 and its insulation liner 13 by the winding thereon of a filament 15 under a selected amount of tension.

The substance 12 is wrapped or enclosed, in the embodiment illustrated in FIGURE 1, by bands 16 of any suitable material providing a desired retaining strength. The bands 16 are not necessarily of the same width, but are shown for purposes of simplicity to have equal widths in the embodiment presently being described. The bands 16 are applied over the substance 12, and the ends 17 of the respective bands 16 are joined by suitable buckle, hasp or other clamping means, not shown, to provide the desired amount of restraining force. The bands 16 are preferably applied about the substance 12 in the order of bands 16a, 16b, 16c, 16d, and 16e so as to achieve a uniform degree of confinement of the substance 12 and a smooth mold line. Filament 15 when being wound on the non-rigid substance 12 is started above the level of the extreme bands, either at the top or bottom band 16a or 16b, and as the winding of the filament 15 approaches the respective bands 16, the bands 16 are removed successively so that the substance 12 about which the filament 15 is being wound has a minimum area which is not restrained, thereby reducing deformation of the substance 12 to a non-significant amount. For example, when the winding of the filament 15 approaches band 16a, that band is removed and the winding of the filament 15 is then continued under desired tension to band 16e whereupon that band is removed and the winding of the filament 15 is continued to band 16c whereupon that band is removed, and so forth to the last band in the embodiment, band 16b.

It is apparent that by a proper choice of band width and clamping pressure holding the bands 16 about the substance 12, a degree of apparent rigidity can be maintained in the exposed area of the substance 12 sufficient to resist the tension of the filament 15 being wound thereabout without a significant deformation of the substance 12, since the substance 12, in a preferred embodiment a propellant grain, can otherwise freely move into the band area enclosed by the next succeeding band. During the winding of the filament 15 about the substance 12, the substance 12 may be caused to rotate by means, not shown, imparting rotation to the shaft 11 to which the substance 12 is fixedly attached.

FIGURE 2 illustrates a second embodiment of the present invention, in which a restraining wrap 20 is used in place of the bands 16 illustrated in FIGURE 1. The restraining wrap 20 is of strip material of suitable strength and non-elastic property to confine the substance 12 under a desired pressure. The winding of the strip material 20 is commenced at or toward the end of the substance 12 remote from where the winding of the filament 15 is to begin, and is later unwound slightly in advance of the winding of the filament 15 over the insulation liner 13 of the substance 12. The elongated strip 20, in the embodiment illustrated, is a continuous helix of strip metal which when it is unwound from the substance 12 exposes only enough insulated propellant area to the oncoming filament windings as to prevent undue deformation of the non-rigid substance 12. Although the strip material 20 has been described as metal, it will be appreciated that other materials, such as reinforced paper or cloth, may be used as the restraining wrap for the substance 12 with the provision only that the material so used should withstand the desired tension to be applied without undue lengthening or without breaking. Similarly, the band material of bands 16a through 16e in FIGURE 1 may also be of metal or other suitable materials having similar strength and non-elastic qualities.

Deformation of the substance 12 is so reduced in accordance with the present invention as to permit the windings of the filament 15 to be applied about the substance 12 to a desired thickness, thereby providing any desired thickness of case to be formed over the substance 12. In the embodiments shown, the filament winding is preferably a resin impregnated glass filament. However, windings of other strand materials, such as cloth or synthetic fibers, may also be applied as a case for the substance 12 in practicing the present invention. By applying the filament windings about the substance 12 in accordance with the present invention, a uniform degree of confinement of the substance 12 as well as a smooth mold line are obtained, since the non-rigid substance 12 which is being enclosed or encased by the filament windings is presented from moving outward in an area thereof in advance of the filament windings because of the temporary restraining confinement of the substance 12 by the bands 16 or the elongated strip 20. The tendency of a low-modulus elastomeric solid propellant grain to be deformed locally under an applied winding tension in the filament being wound thereabout is greater in larger units, and the present invention provides for desirable temporary restraining confinement of larger masses to be encased or enclosed by filament windings.

Through the temporary confinement and restraint of the non-rigid substance 12 as disclosed herein, the occurrence of buckled reinforcements is prevented, and the reduced load carrying ability formerly encountered in the enclosing structure (i.e. the casing comprising filament windings) for the substance is avoided, while a highly uniform shape and strength of the casing of filament windings for the substance is obtained.

Obviously, many modifications and variations of the present invention are possible in the light of the above teachings. It is therefore to be understood that within the scope of the appended claims, the invention may be practiced otherwise than as specifically described.

I claim:

1. The method of encasing a deformable substance with a case formed from filament windings, said method comprising wrapping the substance in strip material to provide a temporary confining restraint about the substance, and winding a filament about the substance while progressively removing portions of the strip material from the substance as the filament being wound about the substance approaches the respective portion of the strip material to be removed, whereby deformation of the substance when the filament is being wound thereabout is substantially reduced.

2. The method of encasing a formed low-modulus elastomeric substance with a case formed from filament windings, said method comprising wrapping the substance in bands of strip material to provide a temporary confining restraint about the substance, and winding a filament about the substance while successively removing the bands of strip material from the substance as the filament being wound about the substance approaches each of the bands of strip material, whereby deformation of the substance when the filament is being wound thereabout is substantially reduced.

3. The method of encasing a formed low-modulus elastomeric substance with a case formed from filament windings, said method comprising wrapping the substance in a helix of strip material to provide a temporary confining restraint about the substance, and winding a filament about the substance while progressively unwrapping the helix of strip material from the substance slightly in advance of the filament being wound about the substance, whereby deformation of the substance when the filament is being wound thereabout is substantially reduced.

4. The method of encasing a formed insulated low-modulus elastomeric solid propellant grain with a case formed from filament windings, said method comprising wrapping the insulated grain in a restraining material applied under a selected tension to provide a temporary confining restraint about the insulated grain, and winding a filament about the insulated grain while progressively removing the restraining material from the insulated grain slightly in advance of the filament being wound about the insulated grain, whereby deformation of the insulated grain when the filament is being wound thereabout is substantially reduced.

5. The method of encasing a formed insulated low-modulus elastomeric solid propellant grain with a case formed from filament windings, said method comprising enclosing the insulated grain in bands of material under a selected tension to provide a temporary confining restraint about the insulated grain, and winding a filament about the insulated grain while successively removing the bands from the insulated grain in a sequence in advance of the filament being wound about the insulated grain, whereby deformation of the insulated grain when the filament is being wound thereabout is substantially reduced.

6. The method of encasing a formed insulated low-modulus elastomeric solid propellant grain with a case formed from filament windings, said method comprising enclosing the insulated grain in a helix of strip material under a selected tension to provide a temporary confining restraint about the insulated grain, and winding a filament about the insulated grain while progressively unwinding the helix of strip material from the insulated grain in advance of the filament being wound about the insulated grain, whereby deformation of the insulated grain when the filament is being wound thereabout is substantially reduced.

References Cited in the file of this patent

UNITED STATES PATENTS

| | | |
|---|---|---|
| 2,203,815 | Dahl et al. | June 11, 1950 |
| 2,917,424 | Hirsch et al. | Dec. 15, 1959 |
| 2,995,011 | Kimmel | Aug. 8, 1961 |
| 2,997,955 | Wade et al. | Aug. 29, 1961 |
| 3,067,707 | Ellzey | Dec. 11, 1962 |
| 3,083,610 | Lancy | Apr. 2, 1963 |